(12) United States Patent
Mozo

(10) Patent No.: US 8,424,886 B2
(45) Date of Patent: Apr. 23, 2013

(54) HANDLE ASSEMBLY FOR A CARRIER

(75) Inventor: Robert C. Mozo, Clay, NY (US)

(73) Assignee: Morse Manufacturing Co., Inc., East Syracuse, NY (US)

( * ) Notice: Subject to any disclaimer, the term of this patent is extended or adjusted under 35 U.S.C. 154(b) by 355 days.

(21) Appl. No.: 12/702,015

(22) Filed: Feb. 8, 2010

(65) Prior Publication Data

US 2011/0193306 A1 Aug. 11, 2011

(51) Int. Cl.
*B62B 3/04* (2006.01)
*B60R 9/06* (2006.01)
*B25G 3/32* (2006.01)

(52) U.S. Cl.
USPC .......................... 280/47.371; 16/422; 280/769

(58) Field of Classification Search ............. 280/47.371; 74/553, 578; 224/511, 547; 16/422
See application file for complete search history.

(56) References Cited

U.S. PATENT DOCUMENTS

| | | | |
|---|---|---|---|
| 1,321,713 A | 11/1919 | Buie | |
| 2,232,548 A | 2/1941 | McAnerney | |
| 2,472,989 A | 6/1949 | Skipper et al. | |
| 3,013,517 A | 12/1961 | Isham | |
| 3,132,886 A | 5/1964 | Meeks | |
| 4,105,238 A * | 8/1978 | Stright | 294/11 |
| 4,277,075 A | 7/1981 | Shay | |
| 5,249,908 A | 10/1993 | Tsai | |
| 6,135,479 A | 10/2000 | Tibay et al. | |
| 6,382,643 B1 | 5/2002 | Baker | |
| 6,398,066 B1 * | 6/2002 | Mullins | 220/759 |
| 6,488,293 B1 | 12/2002 | Mitchell et al. | |
| 6,682,084 B2 * | 1/2004 | Webster et al. | 280/79.5 |
| 6,729,631 B2 | 5/2004 | Trine et al. | |
| 6,974,140 B2 | 12/2005 | Neuman | |
| 2003/0214107 A1 | 11/2003 | Fernandez | |
| 2008/0107511 A1 | 5/2008 | Oberg | |
| 2009/0189381 A1 * | 7/2009 | Kirtland | 280/769 |

OTHER PUBLICATIONS

Rubbermaid Commercial Products LLC, Brute Trainable Dolly Pull Handle, URL: http://www.rcpworksmarter.com/rcp/products/detail.jsp?rcpNum=2652& search=2652.
Northern Tool + Equipment Catalog Co., Northern Industrial Drum Dolly with Long Handle, URL: http://www.northerntool.com/webapp/wcs/stores/servlet/product_6970_200307371_200307371.
Global Equipment Company, Incorporated, Drum Dolly with 4ft. Nylon Pull Strap, URL: http://www.globalindustrial.com/p/material-handling/drum-barrel/drum-handling/drum-dolly-5-30-55-gallon-drums-1.
Vestil Manufacturing Corporation Low Profile Drum Caddies with Bung Wrench Handle URL: http://www.vestilmfg.com/products/dheguip/drum_caddies.htm.

* cited by examiner

*Primary Examiner* — John Walters
*Assistant Examiner* — James Triggs
(74) *Attorney, Agent, or Firm* — George R. McGuire; Bond Schoeneck & King PLLC

(57) ABSTRACT

A handle assembly for a carrier including a primary bracket, an upper engagement piece adjustably connected to the primary bracket, and a lower engagement piece pivotally connected to the primary bracket, the lower engagement piece including an actuation mechanism, such as a kick plate, for pivoting the lower engagement piece relative to the upper engagement piece. A biasing mechanism, such as a coil spring, is linked to the lower engagement piece to urge the lower engagement piece upward. The handle assembly is easily connectable and removable from a carrier such as a dolly.

16 Claims, 3 Drawing Sheets

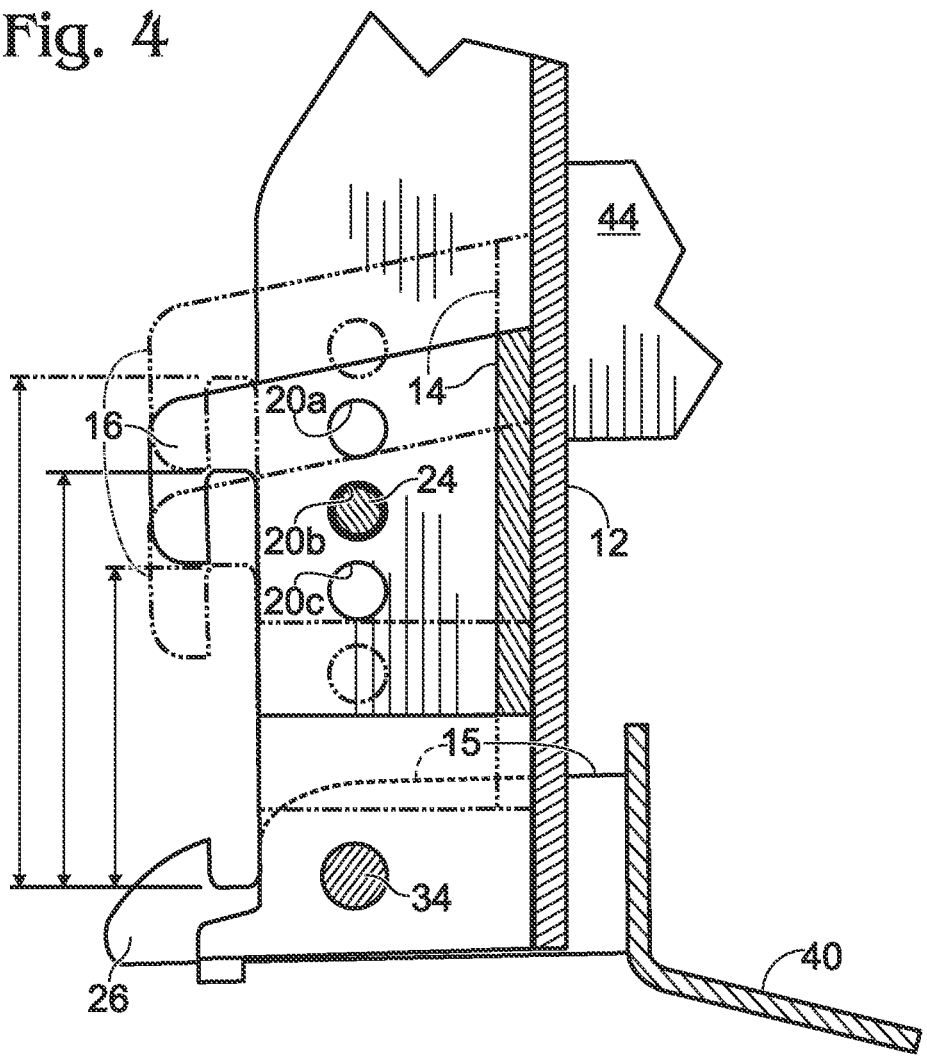

HANDLE ASSEMBLY FOR A CARRIER

FIELD OF THE INVENTION

Embodiments of the present invention are directed to a carrier for containers, and more particularly to a handle assembly for a carrier.

BACKGROUND OF THE INVENTION

Containment drums or barrels are cylindrical containers used to store and ship industrial and commercial liquids or solids. Drums can be made of steel, dense paperboard (commonly called fiber drums) or plastics, and are generally used for the transportation of certain dangerous materials or modest quantities of bulk goods. For caustic and acid materials, plastics, usually thermoplastics such as like polyethylene, nylon, polystyrene, polyvinyl chlorides (pvcs) or possibly polycarbonates are the preferred shipping container; for flammable substances like most petroleum distillates, and alcohol, etc., metal containers are the standard. The fiber drums referred to above will easily hold 400-600 pounds, and are usually coated internally with a urethane or plastic protective coating. They have steel reinforcement rims at their ends and are sufficiently strong.

Drums come in a variety of sizes, including, but not limited to, 5, 20, 30, 55, 65, and 95 gallon sizes. Typically, the standard nominal volume of these drums is 55 US gallons and the exact capacity varies with wall thickness and other factors. Standard 55 gallon drums are 22.5 inches (572 mm) in diameter and 33.5 inches (851 mm) high. The 55-gallon drum will fit four to a fork truck standard wooden shipping pallet to provide ease of handling and shipping. The drum's size, shape and weight distribution lends itself to being moved about readily on the loading dock or factory floor with a two-wheeled drum truck.

Regardless of the drum's size, movement of the drum during use may be conducted on a dolly. Many types of dollies are available. They typically include a base or support section and a rim or wall section. The base is supported on a series of wheels or casters that swivel for easy movement in any direction. The dollies may be pushed or pulled by pushing/pulling the actual drum. Pushing or pulling the drum does not always allow easy steering in the correct direction due to the cumbersome volume and shape of the drum.

In order to assist in transporting a drum down an aisle or over a threshold, a pull strap is sometimes used. Pull straps are typically 4 feet long and fabricated of a nylon or similar material. Again, this does not always provide easy control of the drum in the desired direction due to the flimsiness of the strap. In fact, using the strap may increase safety concerns due to the inability to have tight control of the movement.

Thus, a need exists for a way to easily and safely move drums or other objects adapted for movement on a wheeled carrier. It would be beneficial to provide a simple, effective means to easily steer a drum when positioned on a dolly. It is desirable to provide a means for moving dollies that increase ease of movement while addressing safety concerns.

SUMMARY OF THE INVENTION

It is a primary object of an embodiment of the present invention to provide a handle assembly for a drum carrier including a primary bracket, an upper engagement piece adjustably connected to the primary bracket, and a lower engagement piece pivotally connected to the primary bracket, the lower engagement piece including an actuation mechanism, such as a kick plate, for pivoting the lower engagement piece relative to the upper engagement piece. A biasing mechanism, such as a coil spring, is linked to the lower engagement piece to urge the lower engagement piece upward.

According to another aspect of the handle assembly, a handle is permanently attached to or removably attached to the primary bracket. The handle may be pivotally attached to the primary bracket.

According to a further aspect of the handle assembly, the primary bracket includes a plurality of positions for adjusting the height of the upper engagement piece. The upper and lower engagement piece each include a set of jaws for engaging a drum carrier in a locking manner. The upper engagement piece is in a fixed position and the lower engagement piece is pivotable to engage the drum carrier According to yet another aspect of the handle assembly, the lower engagement piece is connected to the primary bracket by a bolt, wherein the lower engagement piece has an axis of rotation coaxial with the axis of the longitudinal dimension of the bolt.

According to a further aspect of the handle assembly, the primary bracket includes a first pair of openings and the upper engagement piece includes a plurality of second pairs of openings configured to be aligned with the first pair of openings. The handle assembly further includes a pin inserted through the first pair of openings and a second pair of openings for securing the upper engagement piece in the primary bracket.

According to yet another aspect of the handle assembly, the primary bracket includes a third pair of openings and the lower engagement piece includes a fourth pair of openings. The handle assembly further includes a bolt inserted through the third pair of openings and the fourth pair of openings to secure the lower engagement piece to the primary bracket.

According to another embodiment, a drum ("drum" being used in a generic manner to designate any type of object adapted to be moved via a dolly) carrier is provided including a dolly and a removable handle assembly. The dolly includes a base section, a wall section connected to the base section and a series of casters coupled to the base section. The removable handle assembly includes a primary bracket, an upper engagement piece adjustably connected to the primary bracket, and a lower engagement piece pivotally connected to the primary bracket. The lower engagement piece includes an actuation mechanism for pivoting the lower engagement piece relative to the upper engagement piece. The lower and upper engagement pieces engage the wall section of the dolly, providing a secure, safe means for directing and moving the dolly.

According to a further embodiment, a method of using a handle assembly to move a dolly containing a drum is provided, the dolly including a base section, a wall section connected to the base section, and a series of casters coupled to the base section. The method involves clamping the upper and lower engagement pieces onto the wall section of the dolly and pulling or pushing the handle to move the dolly. An actuation mechanism on the handle assembly may include a kick plate that can be moved upward to pivot the lower engagement piece of the handle assembly downward for engagement of the handle assembly onto the wall section of the dolly.

BRIEF DESCRIPTION OF THE DRAWING FIGURES

The present invention will be more fully understood and appreciated by reading the following Detailed Description in conjunction with the accompanying drawings, in which:

FIG. 4 is cross-sectional view of the handle assembly of FIG. 1 at line 4-4.

DETAILED DESCRIPTION OF THE INVENTION

Figure 1:
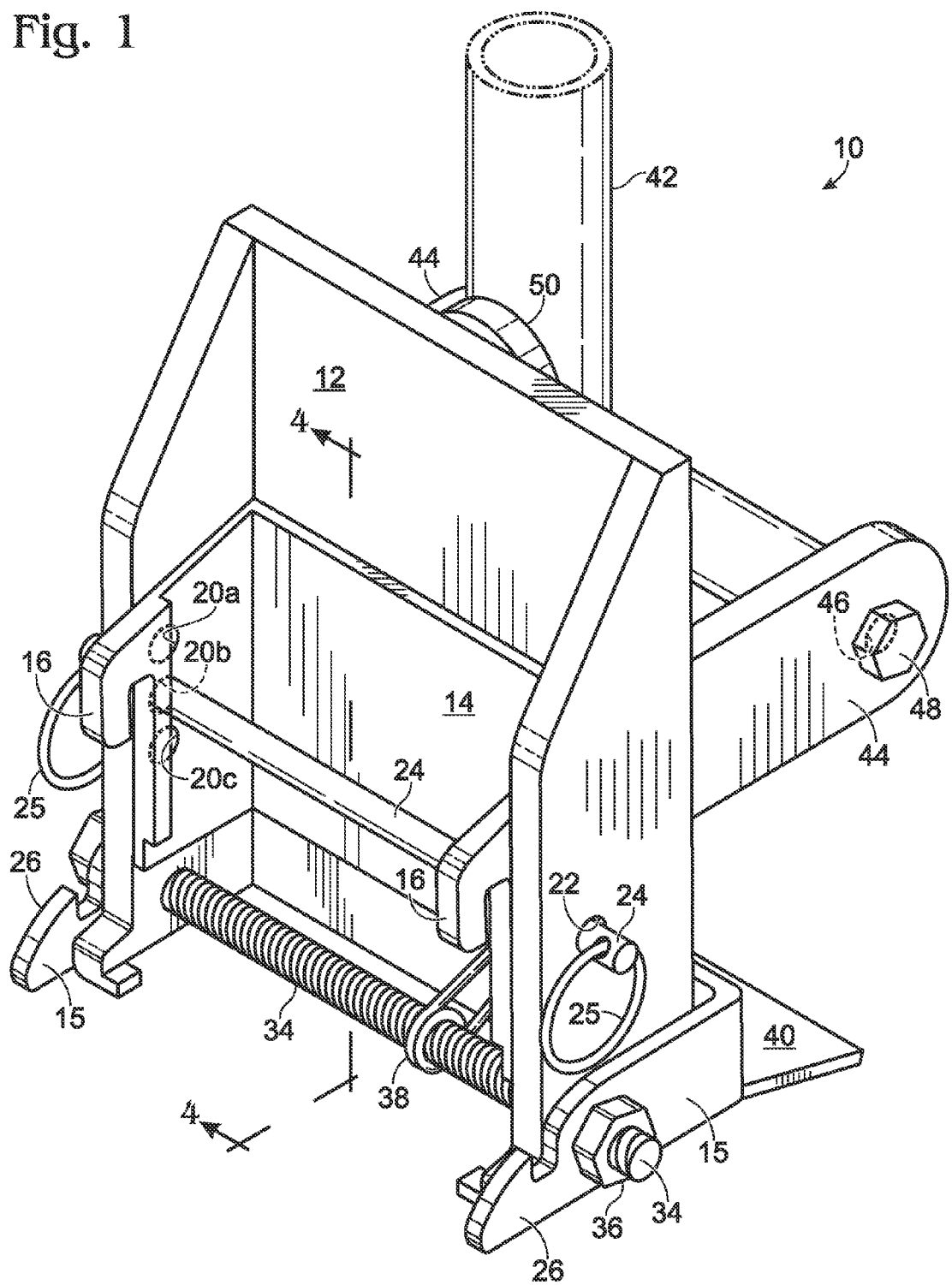
FIG. 1 is a perspective view of a handle assembly according to an embodiment of the present invention.
Figure 2:
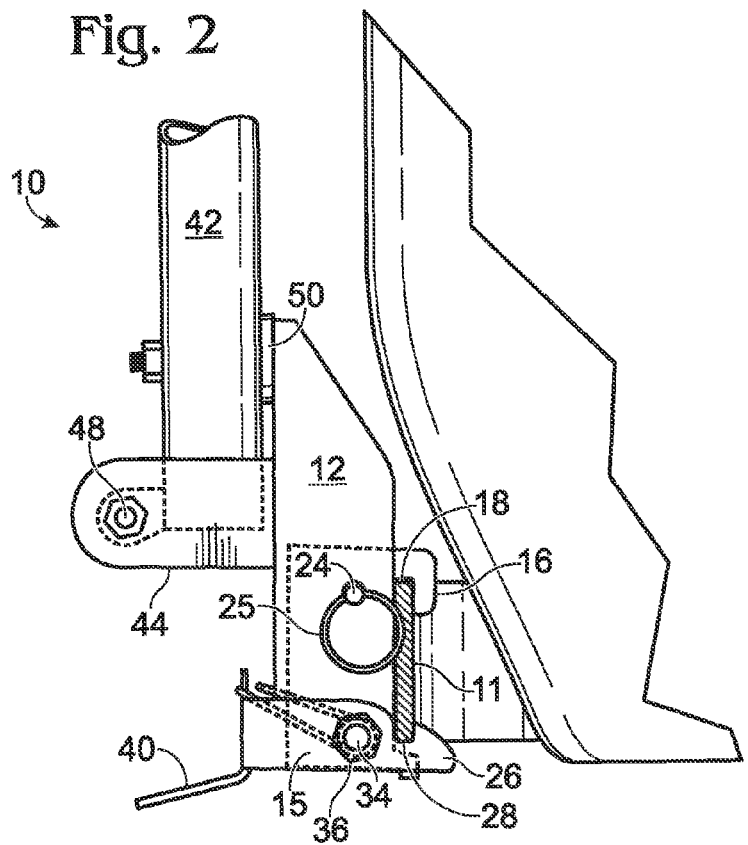
FIG. 2 is a side elevation view of the handle assembly of FIG. 1 positioned on a drum carrier.
Figure 3:
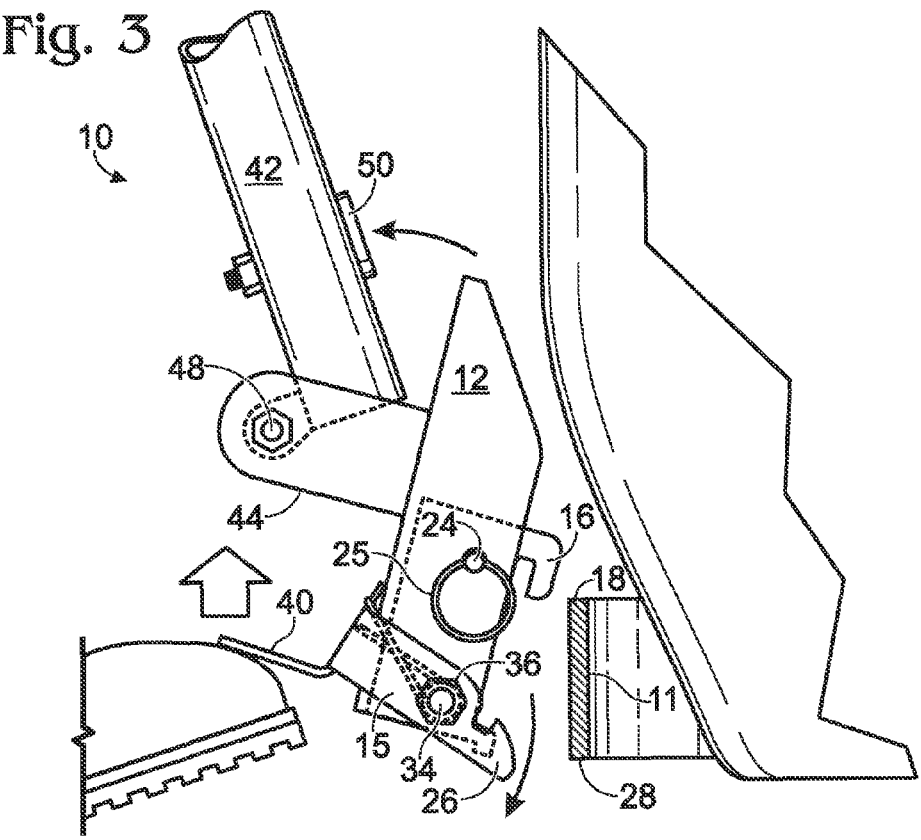
FIG. 3 is a side elevation view of the handle assembly of FIG. 1 showing operation of the actuation mechanism.

As will be appreciated, an embodiment of the present invention provides a handle assembly 10 as shown in FIGS. 1 through 4 for affixing to a drum carrier or dolly 11 (shown in FIGS. 2 and 3). Handle assembly 10 includes a primary bracket 12 to which a series of components are attached to form the assembly 10. An upper engagement piece 14 is fit within primary bracket 12 proximate the upper mid section of primary bracket 12 and a lower engagement piece 15 is disposed on the lower end of the exterior of primary bracket 12. Engagement piece 14 includes a set of appendages or jaws 16 for clamping onto the upper rim 18 of drum carrier 11. Engagement piece 14 includes a plurality of paired openings 20a, b and c, for alignment with paired openings 22 in primary bracket 12. A peg or pin 24 is inserted through paired openings 22 of primary bracket 12 and one of the set of paired openings 20a, b, or c, depending on the height of the drum carrier 11. Pin 24 and locking component 25 secure upper engagement piece 14 in primary bracket 12. Reference is made to FIG. 4, which shows the distance between the upper and lower engagement pieces, 14 and 15, respectively, at the different paired openings 20a, b, and c. Paired openings 20a provide the shortest distance between upper engagement piece 14 and lower engagement piece 15, paired openings 20c provide the longest distance between upper engagement piece 14 and lower engagement piece 15 and paired openings 20b are positioned midway between 20a and 20c to provide yet another width option for clamping onto a carrier. The upper engagement piece 14 may have as many openings and located at as many varied positions as desired to accommodate the variety of sizes of drum carriers. Accordingly, upper engagement piece 14 is adjustable to provide the desired fit for the carrier to be transported. Additionally, the size of each component, e.g., primary bracket 12, upper and lower engagement pieces, 14 and 15, of handle assembly 10 may vary to accommodate the size of the carrier to be transported.

Lower engagement piece 15 also includes a pair of grooves or jaws 26 for engaging the lower rim 28 of drum carrier 11. Lower engagement piece 15 includes a pair of openings for aligning with a pair of openings 32 in primary bracket 12. A bolt 34 is inserted through openings 30 and 32 to pivotally couple the lower engagement piece 15 to primary bracket 12. A set of nuts 36 are placed on bolt 34 to maintain bolt 34 in the openings of the primary bracket 12 and lower engagement piece 15. Lower engagement piece 15 pivots about bolt 34. A biasing mechanism 38 is located on the bolt 34 and coupled to primary bracket 12. Biasing mechanism 38 may be any known mechanism, such as a coil spring, or a mechanism, to be developed in the future, that can be used as a biasing mechanism. Biasing mechanism 38 provides a force in the upward direction to allow lower engagement piece to bias upward and lock onto the lower surface 28 of drum carrier 11 during use. The pivot action of lower engagement piece 15 occurs about a horizontal axis that is coaxial with the axis of the longitudinal dimension of bolt 34 to allow engagement of jaws 16 and 26 onto drum carrier 11. The angle of rotation of lower engagement piece 15 is about 20 degrees.

FIG. 3 shows the pivot mechanism in operation. An actuation member or mechanism such as kick plate 40 extends from the rear side of lower engagement piece 15, which allows operation of the pivot mechanism with one's foot. Any type of actuation member may be used to control the pivot action of the lower engagement piece 15. Upward motion of the kick plate 40 increases the distance between upper and lower jaws 16 and 26, respectively, to provide engagement and disengagement of the handle assembly 10 from drum carrier 11.

Handle assembly 10 includes a handle 42 attached to primary bracket 12. Handle 42 may be permanently or releasably attached to primary bracket 12. Handle 42 is pivotally connected to primary bracket 12 with a pivot or similar mechanism and has a wide range of motion (approximately 180 degrees) and may alternatively be fixed in place at the desired position for ease of pushing or pulling the drum carrier (or for storage of the unit when fixed in an upright position). The pivot or linking mechanism may include any existing mechanism or mechanism to be developed in the future that provides linking of the handle to the primary bracket. As shown, primary bracket 12 includes a pair of appendages 44 with openings 46 therein for insertion of a pin or bolt 48 through handle 42 and openings 46 for connection to one another. A magnet 50 is located on handle 42 to magnetically retain handle 42 in its upright position; thus when the handle is in its upright position for storage, it cannot as a practical matter be used to push or pull as the magnet would disengage from the handle.

Placement of handle assembly 10 onto a drum carrier 18 is as follows. It is preferable to determine or measure the size of the drum carrier 11 (width from top 18 to bottom surface 28) to approximate the distance required between the upper and lower engagement pieces, 14 and 15, respectively. The upper engagement piece 14 may be adjusted to the correct height by moving the upper engagement piece to the necessary height and aligning the openings in the upper engagement piece 14 with the openings in the primary bracket and inserting the pin 24. The jaws 16 of upper engagement piece 14 are clamped onto the upper surface 18 of drum carrier 11 as shown in FIG. 2 and the lower engagement piece 15 is pivoted downward as shown in FIG. 3 to the point of fitting onto lower surface 28 of drum carrier 11. The pivot of lower engagement piece 15 is actuated for engaging and removing assembly 10 from drum carrier 11. The biasing mechanism 38 creates a locking connection of the lower engagement piece 14 onto the drum carrier 11.

The components of the assembly 10 and handle 42 are fabricated of metal, plastic, wood or any material durable to withstand the weight required to move containment drums. It is preferable that the assembly 10 and handle 42 are fabricated of steel, such as carbon steel or stainless steel.

The handle assembly provides a facile means for moving containment drums. It is easily connectable and easily removable for connection to any size of drum carrier. A safe, easily controllable handle for drum carriers is provided.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A handle assembly for a drum carrier comprising:
   a primary bracket;
   an upper engagement piece adjustably connected to the primary bracket; and a lower engagement piece pivotally connected to the primary bracket;

the lower engagement piece comprising an actuation mechanism in the form of a kick plate for pivoting the lower engagement piece relative to the upper engagement piece; and a biasing mechanism linked to the lower engagement piece to urge the lower engagement piece upward.

2. The handle assembly of claim 1 further comprising a handle, the handle removably or permanently attached to the primary bracket.

3. The handle assembly of claim 2 wherein the handle is pivotally attached to the primary bracket.

4. The handle assembly of claim 2, further comprising a magnet attached to said handle.

5. The handle assembly of claim 1 wherein the primary bracket comprises a plurality of positions for adjusting the height of the upper engagement piece.

6. The handle assembly of claim 1 wherein the upper and lower engagement pieces are located on the primary bracket configured to engage a drum carrier in a locking manner.

7. The handle of claim 1 wherein the upper engagement piece is in a fixed position and the lower engagement piece is pivotable to engage the drum carrier.

8. The handle assembly of claim 1 wherein the biasing mechanism comprises a coil spring.

9. The handle assembly of claim 1 wherein the upper engagement piece comprises a first set of jaws and the lower engagement piece comprises a second set of jaws.

10. The handle assembly of claim 1 wherein the lower engagement piece is connected to the primary bracket by a bolt, wherein the lower engagement piece has an axis of rotation coaxial with the axis of the longitudinal dimension of the bolt.

11. The handle assembly of claim 1 wherein the primary bracket comprises at least a first pair of openings and the upper engagement piece comprise a plurality of second pairs of openings configured to be aligned with the first pair of openings; and wherein the handle assembly further comprises a pin inserted through the first pair of openings and one of the second pairs of openings.

12. The handle assembly of claim 11 wherein the primary bracket comprises a third pair of openings and the lower engagement piece comprises a fourth pair of openings; and wherein the handle assembly further comprises a bolt inserted through the third pair of openings and the fourth pair of openings.

13. A drum carrier comprising
a dolly; and
removable handle assembly;
the dolly comprising
a base section;
  a wall section connected to the base section; and
  a series of casters coupled to the base section;
the removable handle assembly comprising
  a primary bracket;
  an upper engagement piece adjustably connected to the primary bracket; and a lower engagement piece pivotally connected to the primary bracket;

the lower engagement piece comprising an actuation mechanism in the form of a kick plate for pivoting the lower engagement piece relative to the upper engagement piece;

the lower and upper engagement pieces engaging the wall section of the dolly; and a biasing mechanism linked to the lower engagement piece to urge the lower engagement piece upward.

14. A method of using a handle assembly to move a dolly containing an object, the dolly comprising a base section, a wall section connected to the base section, and a series of casters coupled to the base section, the method comprising:

providing a removable handle assembly comprising a primary bracket, an upper engagement piece adjustably connected to the primary bracket, a lower engagement piece pivotally connected to the primary bracket, a handle connected to the primary bracket, the lower engagement piece comprising an actuation mechanism in the form of a kick plate that is moved upward to pivot the lower engagement piece downward for engagement of the second set of jaws onto the lower surface of the wall section, and a biasing mechanism linked to the lower engagement piece to urge the lower engagement piece upward;

clamping the upper and lower engagement pieces onto the dolly; and pulling or pushing the handle to move the dolly.

15. The method of claim 14 wherein the wall section comprises an upper surface and a lower surface;

the upper engagement piece comprises a first set of jaws for clamping onto the upper surface;

the lower engagement piece comprises a second set of jaws for clamping onto the lower surface and a biasing mechanism for forcing the lower engagement piece in an upward direction; and wherein the biasing mechanism forces the second set of jaws upward to lock the handle assembly onto the dolly.

16. A handle assembly for a drum carrier comprising:
a primary bracket;
an upper engagement piece adjustably connected to the primary bracket; and
a lower engagement piece pivotally connected to the primary bracket;
the lower engagement piece comprising an actuation mechanism for pivoting the lower engagement piece relative to the upper engagement piece;
a biasing mechanism linked to the lower engagement piece to urge the lower engagement piece upward; and
wherein the primary bracket comprises at least a first pair of openings and the upper engagement piece comprise a plurality of second pairs of openings configured to be aligned with the first pair of openings; and
wherein the handle assembly further comprises a pin inserted through the first pair of openings and one of the second pairs of openings.

\* \* \* \* \*